United States Patent Office 3,043,355
Patented July 10, 1962

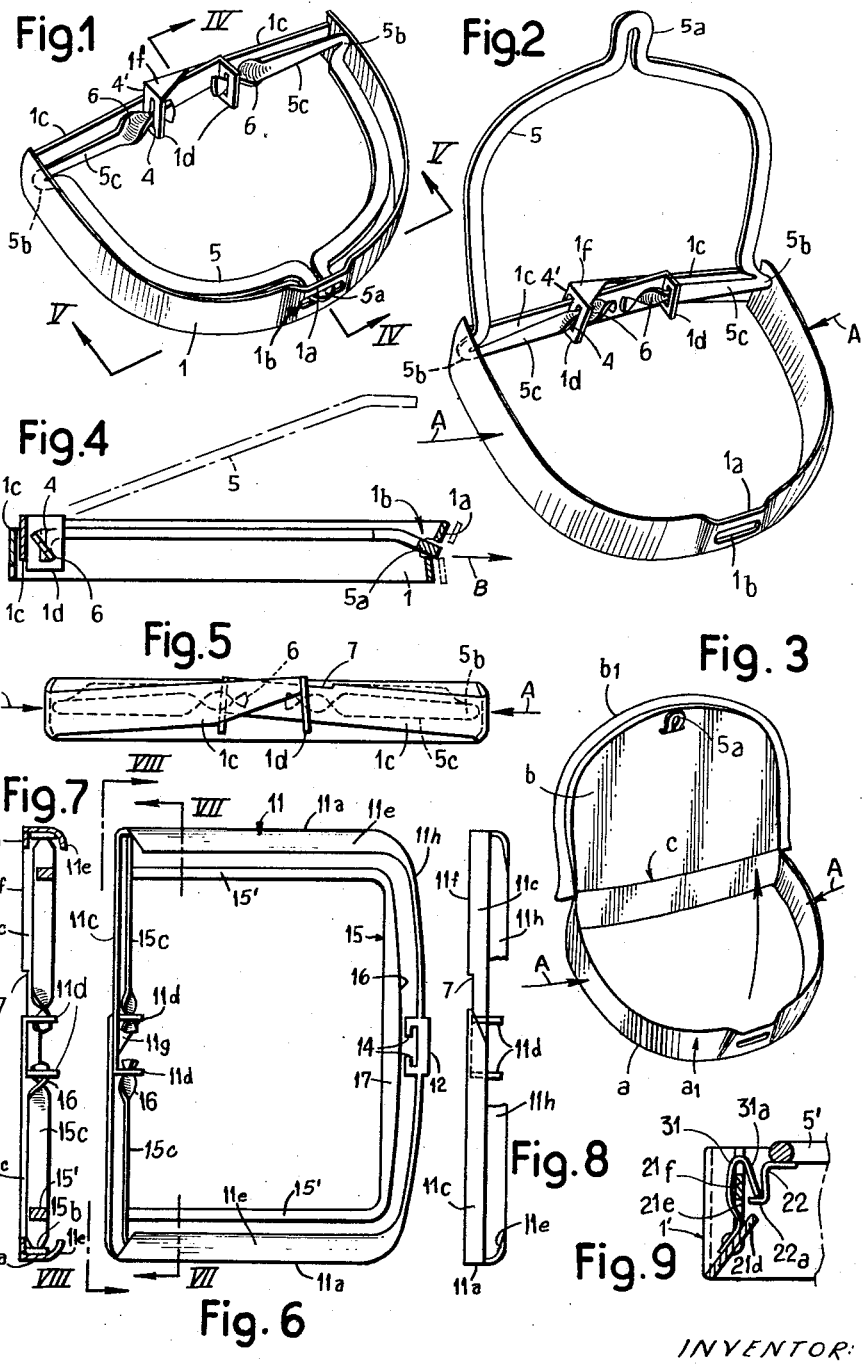

3,043,355
OPENING AND CLOSURE DEVICE FOR A FLAT CONTAINER
Anacleto Rossi, Viale Milton 39, Florence, Italy
Filed Feb. 8, 1960, Ser. No. 7,433
Claims priority, application Italy Feb. 11, 1959
9 Claims. (Cl. 150—7)

The invention relates to an improved closure device for a container such as a purse or a powder-case or other similar article having a cover which may be opened and closed often. The device according to the invention allows opening and closing of a cover of a container by a single hand holding the container.

The device according to the invention includes two interfitted elements each having the outline of the container. Both elements are flexible. One is linked to the other along a common substantially rectangular side. A helical coupling is provided between the two elements along the rectangular side and along a linking axis in such a way that compressing the device in the direction of the linking axis results in resilient deformation and shortening of the rectangular side, a relative slipping on the helical coupling and a rotation of the elements with respect to each other.

In a container embodying the invention, a first frame element having a rectangular side and two aligned side-by-side extensions. The extensions have tabs with linear slots. A second frame element of the container is provided with two opposed portions near the rectangular side of the first element. These opposed portions are helically shaped and are engaged in the linear slots of the respective tabs. The second element is advantageously mounted inside the first element so as to establish two aligned pointed contacts therewith to effect a pivotable linkage coaxial with the helically shaped portions of the second element.

The container may have a hinge on one side for the two elements. On a side hinge may be provided an engagement means for the releasable attachment of the two elements. An appropriate shaping of the helical parts may allow the release of the element which is to rotate, before the rotation occurs.

The invention will be better understood from the following description and the accompanying drawing.

In the drawing:

FIG. 1 illustrates a perspective view of a closed resilient frame for a device embodying the invention.

FIG. 2 illustrates the frame of FIG. 1 in open condition.

FIG. 3 illustrates an open container embodying the invention.

FIG. 4 is a longitudinal section taken along the line IV—IV of FIG. 1.

FIG. 5 is a front view taken along the line V—V of FIG. 1.

FIG. 6 is a bottom plan view of another embodiment of the invention.

FIG. 7 is a section taken along the line VII—VII of FIG. 6.

FIG. 8 is a front edge view taken on line VIII—VIII of FIG. 6.

FIG. 9 is a fragmentary sectional view of part of a container illustrating a closure arrangement.

According to the accompanying drawing, and with reference to FIGS. 1 to 5, numeral 1 denotes a metal springy generally U-shaped symmetrical strip-like element, with an arcuate outline which may correspond substantially to the peripheral edge $a_1$ of a container base $a$ such as shown in FIG. 3. The base $a$ is closable by means of a cover $b$ linked or hinged at side $c$ where the two elements $a$ and $b$ are connected. The cover $b$ may have a closure edge $b_1$. The metal element 1 is provided at the center of its bight with an outwardly extending portion 1a and an opening 1b. The frame element 1 is provided with two transversely extending substantially rectangular arms 1c. These arms are secured at the ends of the U-shaped element 1. These arms are aligned and partly superimposed one on the other, one being inclined with respect to the other as shown in FIGS. 1 to 5. By compressing the sides of element 1 in the direction of the arrows A of FIGS. 2 and 3, a mutal slipping of the arms 1c is obtained. The arms 1c are each provided at its inner free end with an apertured tab 1d which is substantially perpendicular to the remainder of the arm. The tabs have linear slots 4. One of the tabs is stiffened by a small brace plate 1f. This braced tab has two slots 4, 4'. Slot 4' provides a passage for the other arm which slides therein. When the sides of element 1 are pressed inwardly as indicated by arrows A in FIGS. 2 and 3, tabs 1d approach each other.

The device includes a second symmetrical frame element 5. This element may be made of springy metal wire. Element 5 is engaged in cover $b$ at edge $b_1$ thereof (see FIG. 3). The symmetrical element 5 is generally U-shaped and has at the center of its bight a loop extension 5a which is designed to co-operate and engage with extension 1a and opening 1b in the element 1 when the frame element 5 is substantially co-planar with the frame element 1. This cooperation is facilitated by the shape of the edge 1a. The frame element 5 is provided at the ends of its arcuate portion with outwardly projecting loops 5b which bear on corresponding portions of the frame element 1 and define a linking axis of the element 5 with respect to the element 1. The frame element 5 has integral inwardly directed arms 5c extending from loops 5b parallel to the arms 1c. Arms 5c are provided at their ends which are spaced from each other, with a helical twist 6. The arms 5c have a flat cross-section corresponding substantially to the slot 4 of each of the rectangular tabs 1d of the arms 1c.

By this arrangement, when the sides of the frame element 1 are pressed inwardly as indicated by arrows A in FIG. 2, both the resilient symmetrical frame elements 1 and 5 deform. The two arms 5c approach each other. A relative slipping of the helical ends 6 in opening 4 occurs and the ends 6 are caused to rotate due to their helical shape. The entire frame element 5 is compelled to rotate and move from the closed and lowered position of FIG. 1 to the open upright position of FIG. 2. When the pressure on the sides of element 1 is released in the opposite direction of the arrows A of FIGS. 2, 3 and 5, the elements 1 and 5 mutually rotate to close frame element 5 in element 1 to the position of FIG. 1.

Because of the resiliency of the members and the rectangular shape of end portions 6 of the arms 5c, it is possible to obtain positive locking of the loop extension 5a in the opening 1b. One rectangular portion of each of ends 6 of the arms 5c may cause a mutual deformation of the elements 1 and 5 to effect a mutual spacing and disengagement of the extension 1a and loop 5a as indicated by arrow B in FIG. 4 when the sides of element 1 are first pressed inwardly. Further inward pressure in the direction of arrows A advances the twisted portions of each arm end 6 through tabs 1d causing the frame elements to rotate and open.

According to the embodiment of FIGS. 6 to 8, the parts corresponding to those of FIGS. 1–5 are similarly numbered. Frame element 11 has a generally rectangular U-shape and frame element 15 is also rectangularly U-shaped. Element 11 is somewhat channel-shaped with a flat outer side 11a, a flat inturned edge 11b and an inwardly bent and curved opposed edge 11e. Flat transverse arms 11c extend inwardly of the sides of element 15. Transverse arms 15c of frame element 15 extend inwardly parallel to arms 11c. Opposing ends 16 of arms 15c are twisted and extend through slots in tabs 11d formed on the ends of arms 11c. A step 7 may be provided in one edge 11f of an arm 11c to engage the free end of the other arm and limit its inward movement. This engagement also limits the angular opening of frame element 15 with respect to frame element 11. Brace plate 11g reinforces one tab 11d. Bight 11h of frame 11 has a finger grip 12 formed at its center with two spaced inner extensions. These extensions terminate short of the outer curved edge 16 of the bight 17 of frame element 15. No catch structure is provided on the bights of the frame elements. The frame elements open when pressure is applied to the side of frame element 11 and close when the pressure is released, as helical ends 16 of arms 15c turn in tabs 11d. The arms 15' of frame element 15 are spaced from the sides of frame element 11 to permit the arms to clear the inturned side edges 11e. Arms 15c extend outwardly beyond arms 15' to pivot on the sides 11a of frame element 11.

FIG. 9 illustrates a catch assembly different from that of FIGS. 1–5. In FIG. 9, the central bight portion of the frame element 1' has an inclined and internally projecting extension 21d and a window 21e with a small transverse bridge element 21f. At this window 21e a small leaf spring 31 is secured to the projection 21d of element 1'. The spring is bent over the bridge 21f to provide a flexible extension 31a above the projection 21d. The frame element 5' is provided with a Z-shaped tooth 22 whose end 22a extends outwardly. When the frame element 5' is lowered on frame element 1', the end 22a deforms the spring 31, 31a so as to trip over the extension 31a to lock between the latter and the projection 21d. In opening the closed assembly of FIG. 9, the sides of element 1' are pressed together in the same manner as described for element 1. The assembly of members 21d, 21f, 31 and 31a will move outwardly to disengage tooth end 22a and the frame element 5' will rotate up out of frame element 1'.

Various changes and modifications may be made without departing from the spirit and scope of the present invention and it is intended that such obvious changes and modifications be considered within the purview of the annexed claims.

What I claim is:

1. An opening and closing device for a container, comprising a first generally U-shaped springy frame element having a pair of arms extending inwardly of ends of the sides of said element, said arms being flat members having juxtaposed mutually slidable free ends, said arms having tabs at the free ends thereof extending inwardly toward the bight of said element, each of said tabs having a narrow slot therein, and a second generally U-shaped spring frame element normally disposed in the plane of and within the first element, said second element having a pair of other arms extending inwardly of ends of the sides of the second element with free ends of said other arms spaced from each other, said free ends of the other arms being helically twisted and inserted in respective slots of said tabs, said other arms having outer end portions pivotally engaged on the side of the first element, one of the tabs on one of said pair of arms having another slot slidably receiving the other one of said pair of arms, whereby pressure exerted on the sides of the first element inward of said element advances said other arms of the second element toward each other while the free ends of said other arms turn in the first named narrow slots to rotate the second frame element out of the plane of the first frame element, and whereby release of said pressure reverses movement of said other arms to rotate the second frame element to the plane of the first frame element.

2. A device according to claim 1, wherein the sides and bights of the first and second frame elements are curved.

3. A device according to claim 1, wherein the sides and bights of the first and second frame elements are substantially straight.

4. A device according to claim 1, wherein one of said pair of arms of the first frame element has a step engageable by the tab carried by the other one of said pair of arms to limit inward movement of said pair of arms when pressure is exerted on said sides of the first frame element, whereby rotation of the second frame element out of the first frame element is limited.

5. A device according to claim 1, further comprising catch means at the bights of the first and second frame elements mutually engageable when the second frame element is disposed in the plane of the first frame element.

6. A device according to claim 5, wherein said catch means includes a loop on the bight of the first frame element and opening in the bight of the second frame element.

7. A device according to claim 5, wherein the free ends of said other arms have rectangular portions permitting inward movement of the sides of the first and second frame elements when said pressure is applied to distort the frame elements and cause disengagement of said catch means prior to rotation of the second frame element with respect to the first element.

8. A device according to claim 7, wherein said catch means includes a loop on the bight of the first frame element and an opening in the bight of the second frame element.

9. A device according to claim 7, wherein said catch means includes a stepped tooth carried by the bight of the second frame element, and a leaf spring carried by the bight of the first frame element.

References Cited in the file of this patent

UNITED STATES PATENTS

| | | |
|---|---|---|
| 1,505,393 | Kasdan | Aug. 19, 1924 |
| 1,598,991 | Strauss | Sept. 7, 1926 |
| 2,612,200 | June | Sept. 30, 1952 |

FOREIGN PATENTS

| | | |
|---|---|---|
| 130,358 | Germany | Aug. 29, 1901 |